(12) United States Patent
Carton

(10) Patent No.: US 9,297,623 B2
(45) Date of Patent: Mar. 29, 2016

(54) SYSTEM FOR CONTROLLING THE TRAJECTORY OF A JET-PROPELLED MOBILE

(75) Inventor: Laurent Carton, St Florent sur Cher (FR)

(73) Assignee: MBDA FRANCE, Paris (FR)

( * ) Notice: Subject to any disclaimer, the term of this patent is extended or adjusted under 35 U.S.C. 154(b) by 1109 days.

(21) Appl. No.: 13/375,687

(22) PCT Filed: Jun. 8, 2010

(86) PCT No.: PCT/FR2010/000417
§ 371 (c)(1),
(2), (4) Date: Dec. 1, 2011

(87) PCT Pub. No.: WO2010/142867
PCT Pub. Date: Dec. 16, 2010

(65) Prior Publication Data
US 2012/0067976 A1    Mar. 22, 2012

(30) Foreign Application Priority Data
Jun. 12, 2009 (FR) .................................. 09 02861

(51) Int. Cl.
*F42B 10/66* (2006.01)
*F02K 9/90* (2006.01)
*F02K 1/00* (2006.01)

(52) U.S. Cl.
CPC ................. *F42B 10/66* (2013.01); *F02K 1/006* (2013.01); *F02K 9/90* (2013.01)

(58) Field of Classification Search
CPC ........... F02K 1/006; F02K 9/90; F42B 10/66; F42B 10/665

USPC ..................................... 244/3.22, 3.3; 60/230
See application file for complete search history.

(56) References Cited

U.S. PATENT DOCUMENTS

| | | | | | |
|---|---|---|---|---|---|
| 2,694,898 | A | * | 11/1954 | Stauff | 239/265.37 |
| 3,058,304 | A | * | 10/1962 | Corbett | 239/265.35 |
| 3,069,852 | A | * | 12/1962 | Stricker | 239/265.25 |
| 3,532,304 | A | * | 10/1970 | Pyptiuk | 60/228 |
| 3,786,993 | A | * | 1/1974 | Burgess et al. | 60/230 |
| 3,850,387 | A | * | 11/1974 | Bjornson et al. | 244/3.22 |
| 3,979,067 | A | * | 9/1976 | Nash | 239/265.35 |
| 4,143,837 | A | * | 3/1979 | Thunholm | 244/3.22 |
| 4,272,040 | A | * | 6/1981 | Bastian et al. | 244/3.22 |
| 4,562,980 | A | * | 1/1986 | Deans et al. | 244/3.22 |
| 4,805,840 | A | * | 2/1989 | Tape | 239/265.35 |
| 7,040,212 | B1 | * | 5/2006 | Gaywood et al. | 89/1.801 |
| 2008/0179449 | A1 | | 7/2008 | Hatalsky et al. | |

FOREIGN PATENT DOCUMENTS

GB       1 230 760 A      5/1971

OTHER PUBLICATIONS

International Search Report completed Sep. 29, 2010 and mailed Oct. 7, 2010 from corresponding International Application No. PCT/FR2010/000417 filed Jun. 8, 2010 (2 pages).
Written Opinion from corresponding International Application No. PCT/FR2010/000417 filed Jun. 8, 2010 (14 pages).

* cited by examiner

*Primary Examiner* — Ted Kim
(74) *Attorney, Agent, or Firm* — Klein, O'Neill & Singh, LLP

(57) ABSTRACT

The system of the present disclosure includes at least one flow deflector located outside the nozzle of the mobile and hinged on the rear bottom of the latter, and angular orientation means for the deflector by rotation about the longitudinal axis of the nozzle.

6 Claims, 2 Drawing Sheets

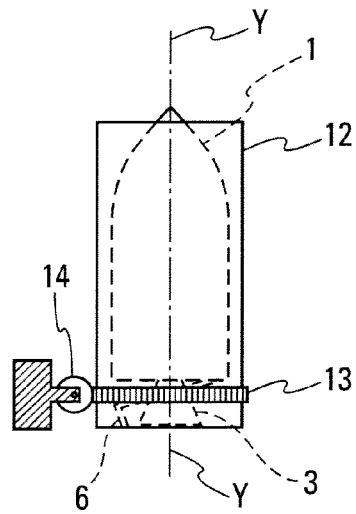
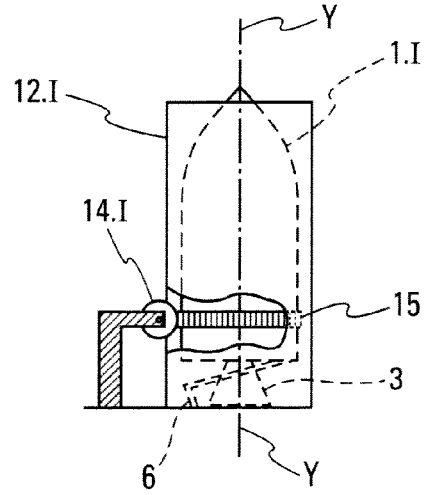
Fig. 4
Fig. 6
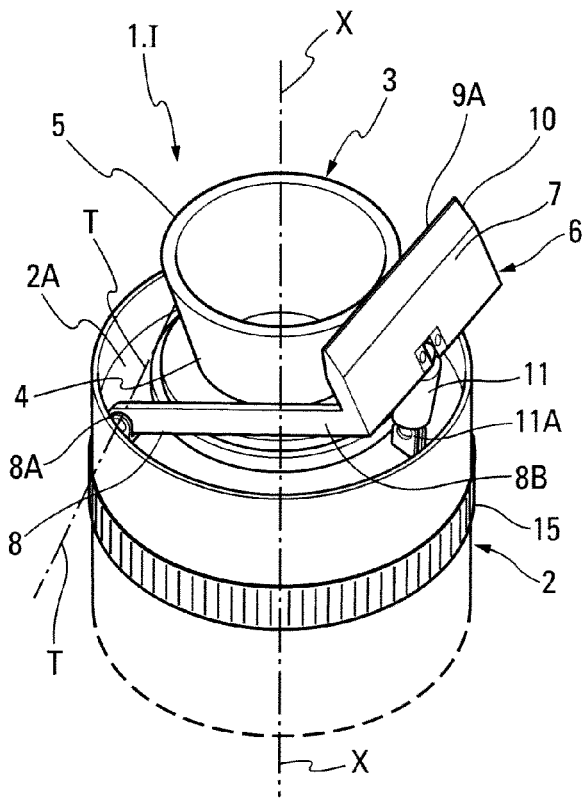
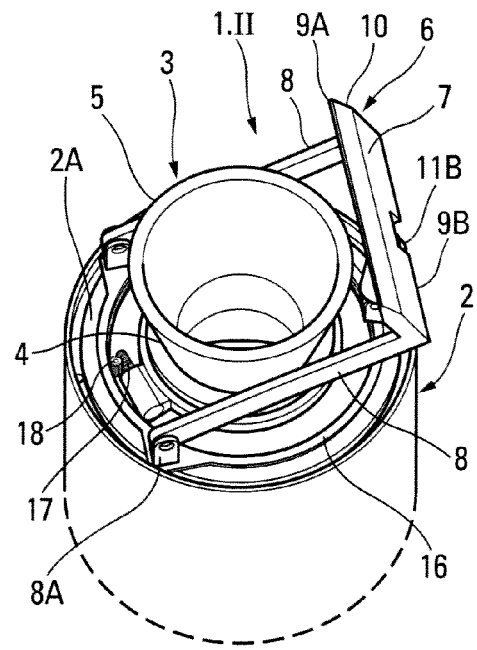
Fig. 5
Fig. 7

SYSTEM FOR CONTROLLING THE TRAJECTORY OF A JET-PROPELLED MOBILE

CROSS-REFERENCE TO RELATED APPLICATIONS

This is a national phase application under 35 U.S.C. §371 of PCT Application No. PCT/FR2010/000417 filed Jun. 8, 2010, which claims the benefit of French application No. 09/02861 filed Jun. 12, 2009, the contents of each of which are expressly incorporated herein by reference.

FIELD OF ART

The present disclosure relates to a system for controlling the trajectory of a mobile, such as a missile, a satellite, etc., as well as a mobile provided with such a system. Although not exclusively, it is particularly appropriate for guiding missiles provided with a thrust accelerator, upon the launching phase of said missiles.

BACKGROUND

As known, for jet-propelled mobiles, it is usual to control their trajectory through a thrust orientation, including upon the initial acceleration phase so as to reduce the trajectory and the flight duration of the mobile.

Thus, a system is known for controlling the trajectory of a missile comprising four control surfaces made in a heat refractory material (for instance carbon/carbon composite materials), directly embedded into the nozzle of the thrust accelerator, within the flow of propelling gas, and each controlled by an actuator.

However, the progressive abrasion of control surfaces, being permanently submitted to a significant heating by propelling gases, results in the thrust deflection being impaired with time. Moreover, the requirement of one actuator per control surface (that is four actuators for the whole control system) considerably increases the bulk and the cost of such a system for controlling the trajectory on-board the missile.

SUMMARY

The present method, system and device aim at solving these drawbacks.

To this end, according to the present method, system and device, the system for controlling the trajectory of a mobile, defined by a launching point and a target point, said mobile being jet-propelled and comprising at least one nozzle, stationary with respect to the rear bottom of said mobile, and with a revolution symmetry with respect to the longitudinal axis of the latter, said system comprising at least one moving flow deflector outside said nozzle and able to enter the outlet flow of said nozzle so as to lead to a deflection of said mobile, is remarkable in that said system comprises means for angularly orient said deflector by rotation around the longitudinal axis of said mobile, preliminarily to the launch thereof, so as to allow during a flight for the deflection of said mobile in a substantially vertical plane going through said launch point and said target point, by the action of said deflector.

Thereby, thanks to the present method, system and device, said flow deflector is arranged outside the nozzle and is not, therefore, submitted permanently to a significant heating by propelling gases, considerably reducing its wear and improving the control of the trajectory in time. In addition, the nozzle of said mobile is preferably simple and stationary, thus this does not require a complex propelling gas tight mobile part to be integrated.

Moreover, the initial acceleration phase being generally of a short duration (a few seconds at most), it is advantageous to angularly orient said deflector preliminarily to the launch of said mobile, so that only the deflection of the mobile in the vertical plane is able to be optionally achieved upon the initial acceleration phase. Thereby, the trajectory and the flight duration of the mobile are reduced.

In an embodiment of the present method, system and device, said mobile being initially launched from a cylindrical shape launching tube, said tube comprises, on its side wall, a toothed projecting peripheral ring and said angular orientation means comprise:
at least one actuator, for instance of the endless screw type, being able to cooperate with said toothed ring of said tube, so as to angularly orient said mobile by rotation of said tube around is longitudinal axis, and
said angularly orientable launching tube.

Thereby, the angular orientation means are not mounted on-board the mobile, accordingly reducing even more the bulk and the cost thereof. Moreover, the angular orientation of the mobile could be achieved preliminarily to its launch.

In another embodiment of the present method, system and device, said mobile being of a cylindrical shape, said angular orientation means comprise:
at least one actuator, for instance of the endless screw type, external to said mobile; and
one toothed projecting peripheral ring, being integral with the side wall of said mobile and able to cooperate with said actuator, so as to angularly orient said mobile by rotation around its longitudinal axis, preliminarily to the launch.

Thus, whatever the external shape of the launching tube of the mobile (for instance with a square section), the angular orientation of said mobile could be achieved preliminarily to the launch thereof.

According to still another embodiment of the present method, system and device, said angular orientation means comprise:
at least one actuator, for instance of the endless screw type, mounted on said rear bottom of the mobile, and
at least one crown mounted movable on said rear bottom of said mobile in rotation around the longitudinal axis of said nozzle. Moreover, in this mode, said deflector is hinged on said moving crown and said crown is able to cooperate with said actuator, so as to angularly orient said deflector by rotation around the longitudinal axis of said nozzle.

Thus, it is possible to achieve an angular orientation of said deflector either preliminarily to the launch of said mobile, or during the flight thereof (for instance upon the initial acceleration phase). Said mobile could thereby be aligned according to any desired direction.

Furthermore, whatever the embodiment of the present method, system and device, said deflector could comprise at least one hinged arm on said rear bottom, through one of its ends, and able to tumble around an axis, as well as a flow deflection member (for instance a paddle, a bucket, etc.) being integral with the other free end of said arm.

Said nozzle comprising a diverging flare, the length of said deflection member is advantageously at least equal to the outlet diameter of said diverging flare.

Advantageously, said flow deflection member is made in a heat refractory material, for instance of the carbon-carbon type.

Preferably, said deflector is controlled by an actuator of the jack type.

It results from the foregoing that the present method, system and device also relate to a jet-propelled mobile comprising a system such as described hereinabove.

BRIEF DESCRIPTION OF THE FIGURES

The figures of the appended drawing will better explain how the present method, system and device can be implemented. In these figures, like reference numerals relate to like components

FIG. 4 is a side view of the missile launching tube of FIG. 1, in accordance with the first embodiment.

FIG. 5 is a view similar to that of FIG. 1, showing the rear of a missile in accordance with a second embodiment of the present method, system and device.

FIG. 6 is a partially exploded view of the launching tube comprising the missile of FIG. 5, in accordance with the second embodiment.

FIG. 7 shows, in a view similar to FIG. 1, the rear of a missile in accordance with a third embodiment of the present method, system and device.

DETAILED DESCRIPTION

Figure 1:
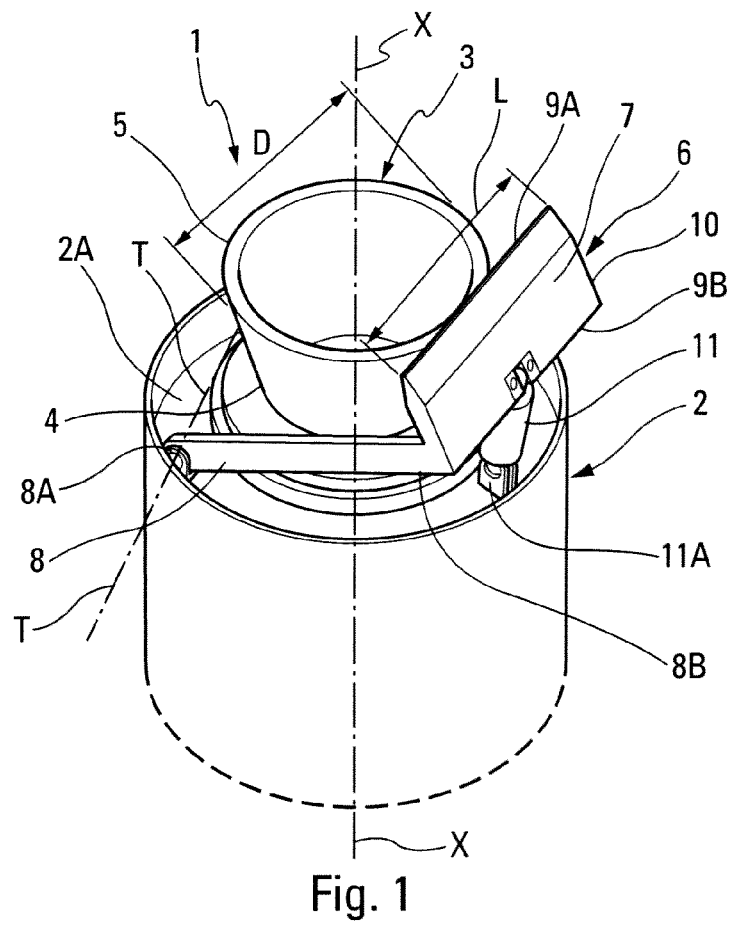
FIG. 1 is a perspective view of the back of a missile according to a first embodiment of the present method, system and device.
Figure 2:
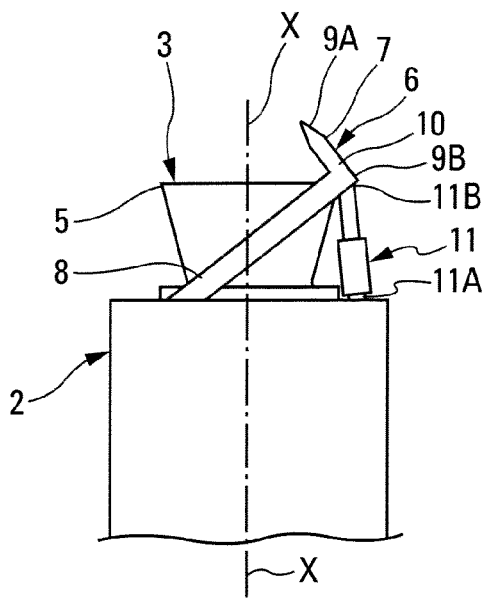
FIGS. 2 and 3 show, in a sideways view, the missile of FIG. 1 wherein the flow deflector respectively occupies a tumbled position and a folded position.
Figure 3:
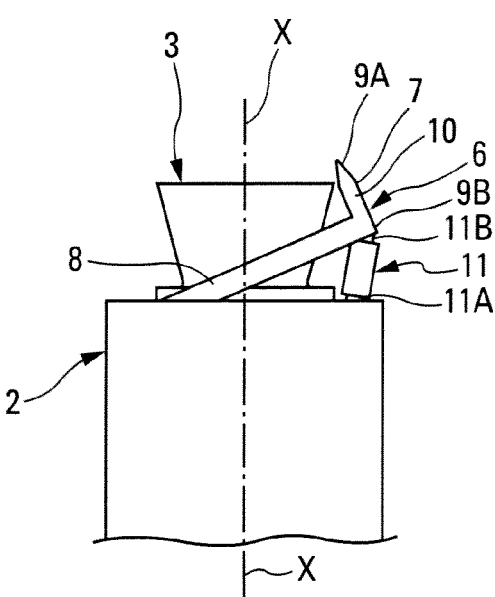

FIGS. 1 to 3 schematically show the rear 2 of a missile, in accordance with the first embodiment of the present method, system and device.

As shown in such FIGS., the rear 2 of the missile 1 comprises a nozzle 3 for jet-propelling the missile 1, being mounted stationary on the rear bottom 2A. The nozzle 3, provided with a neck 4 extended with a diverging flare 5, has a rotational symmetry around its longitudinal axis X-X, matching the longitudinal axis of the missile 1.

Moreover, a flow deflector 6, comprising a flow deflection paddle 7 and two tumbling arms 8 (a single one being shown on FIG. 1), is hinged, through the latter, on the rear bottom 2A of the missile 1, outside the nozzle 3.

The rectangular shaped deflection paddle 7 comprises a tapered longitudinal edge 9A, facilitating the penetration of the deflector 6 into the outlet flow of the nozzle 3. Moreover, the paddle is advantageously made in a heat refractory material, for instance of the carbon-carbon type.

In addition, the length L of the paddle 7 is at least equal to the outlet diameter D of the diverging flare 5 of the nozzle 3.

The tumbling arms 8, surrounding on both sides the nozzle 3, are able to tumble, by means of their hinged end 8A, around a transversal axis T-T, for instance orthogonal to the longitudinal axis X-X of the nozzle 3.

Moreover, the free end 8B of each tumbling arm 8 is integral with one of the side edges 10 of the deflection paddle 7, so that the tumble of the arms 8 communicates a tilted movement to the paddle 7.

The flow deflector 6 is controlled by an actuator 11, for instance of the jack type, being hinged, at one of its ends 11A, on the rear bottom 2A of the missile 1 and, at its other end 11B, on the longitudinal edge 9B of the deflection paddle 7, opposed to the tapered longitudinal edge 9A. Obviously, it is understood that other types of actuator could be contemplated (for instance an electric actuator).

Thus, as shown on FIGS. 2 and 3, the deflection paddle 7 is able to occupy two limit positions:
a tumbled position (FIG. 2), wherein it maximally deflects the outlet flow of the nozzle 3; and
a folded position (FIG. 3), wherein no deflection of the outlet flow is reached.

The deflection paddle 7 could thereby go through the outlet flow of the nozzle 3 between such two limit positions for deflecting the trajectory of the missile 1. The intensity of the deflection of the missile 1 is linked to the angular movement of the deflection paddle 7.

In this first embodiment, as shown on FIG. 4, the missile 1 is launched from a launching tube 12, with an external tubular shape. The tube 12 comprises a toothed projecting peripheral ring 13, being able to cooperate with an external actuator 14, of the endless screw type, so that said tube 12 can rotate on itself around its longitudinal axis Y-Y.

When the missile 1 is arranged inside the launching tube 12 (the longitudinal axis of the missile 1 substantially matching that of the tube 12), the angular orientation of the flow deflector 6 is achieved by rotation of the launching tube 12 around its longitudinal axis Y-Y, by means of the actuator 14.

In this first embodiment, the missile 1 is associated with a system for controlling the trajectory (the latter being, for instance, parabolic and defined by a launch point and a target point) comprising:
the flow deflector 6 being able to penetrate, at least partially, the outlet flow of the nozzle 3, so as to achieve a deflection of the missile 1 during the flight (for instance in the initial acceleration phase); and
means for angularly orienting the deflector 6 (for instance preliminarily to the launch) comprising the launching tube 12 provided with the toothed peripheral ring 13, as well as the actuator 14.

The operation of the system for controlling the trajectory of the missile is as follows.

First of all, during the preparation phase to the launch, the angular orientation of the launching tube 12 is achieved (being supposed in a vertical position) containing the missile 1 by operation of the actuator 14 on the toothed ring 13, so that the deflection of the missile 1 by the deflector 6 is achieved in the vertical plane of the trajectory going through the launch point (that is the launching tube) and the target point. To this end, the tapered longitudinal edge 9A of the paddle 7 is for instance arranged orthogonally to the vertical plane of the trajectory.

Then, upon the initial acceleration phase, the paddle 7 of the deflector 6 is brought in the outlet flow of the nozzle, by means of the actuator 11. Thereby, the parabolic trajectory of the missile 1 could be reduced with respect to a parabolic trajectory without implementing a deflection of the missile, so as to limit the flight duration of the missile 1. In other words, the trajectory of the missile 1 is adjusted on flight as a function, more specifically, of the position of the target point.

In this second embodiment in accordance with the present method, system and device, shown on FIG. 5, all the members described with reference to FIGS. 1 and 3 are present again, except the fact that a toothed projecting peripheral ring 15 is from now on present on the side surface of the missile 1.I (the launching tube 12.I no longer comprising a projecting toothed ring), for instance on its rear 2. This ring 15 is able to cooperate with an actuator 14.I of the endless screw type, for instance associated with the launching tube 12.I (see FIG. 6). The angular orientation of the flow deflector 6 is achieved by rotation of the missile 1.I in the tube 12.I around its longitudinal axis X-X, by means of the actuator 14.I.

Thus, similarly as for the first embodiment, the angular orientation of the flow deflector 6 in accordance with the second embodiment is preferably achieved during the preparation phase to the launch. Nevertheless, contrarily to the first mode, the missile 1.I is oriented directly in the tube 12.I, the latter remaining, for instance, stationary upon the orientation.

The system for controlling the trajectory associated with the second embodiment is similar to that of the first mode, except the fact that the angular orientation means comprise from now on the toothed ring of the missile 15, as well as the actuator 14.I of the endless screw type.

Moreover, the operation of the control system in accordance with the second embodiment is similar to that previously described in relationship with the first mode.

According to the third embodiment of the present method, system and device illustrated on FIG. 7, the rear bottom 2A of the missile 1.II comprises a toothed crown 16 mounted mobile in rotation around the longitudinal axis X-X of the nozzle 3 (being stationary with respect to said bottom 2A), similarly to a bearing.

An actuator 17 of the endless screw type, belonging to the rear bottom 2A of the missile 1, is able to drive in rotation the toothed crown 16, by means of a pinion 18.

In addition, a flow deflector 6, similar to that being described with reference to FIG. 1, is mounted on the moving crown 16, so that any rotation of the latter around the axis X-X drives the deflector 6 in rotation. The actuator 11 for the flow deflector 6 is also mounted on the moving crown 16.

The system for controlling the trajectory associated with the missile 1.II, according to the third embodiment, is on-board the latter. It comprises the flow deflector 6 and angular orientation means comprising, among others:
- the actuator 17 being mounted on said rear bottom 2A of the missile 1.II, and
- the crown 16 being mounted movable on said rear bottom 2A of the missile 1.II.

According to this third mode, the angular orientation of the deflector 6 is achieved by driving the movable crown in rotation 16. It is preferably achieved preliminarily to the launch, during the preparation phase. Obviously, because the orientation means are on-board the missile 1.II, the angular orientation of the deflector 6 could also be achieved after the missile 1.II has been launched, for instance upon the initial acceleration phase.

The invention claimed is:

1. A system for controlling a trajectory of a missile, defined by a launch point and a target point, said missile being jet-propelled and comprising at least one nozzle having a nozzle outlet flow path, said at least one nozzle being stationary with respect to a bottom of said missile and having a revolution symmetry with respect to a longitudinal axis thereof, said system comprising:
   at least one moving flow deflector external to said at least one nozzle and movable at least partially into said nozzle outlet flow path of said at least one nozzle to deflect said missile during flight; and angular orientation means for angularly orienting said at least one moving flow deflector around the longitudinal axis of said missile so as to allow deflection of said missile during flight along a substantially vertical plane going through said launch point;
   a launching tube having said missile positioned therein, said launching tube comprising a side wall;
   wherein said angular orientation means comprises:
      a toothed peripheral ring on said side wall of said launching tube; and
      at least one actuator operatively coupled with said toothed peripheral ring of said launching tube to angularly orient said tube to angularly orient said at least one moving flow deflector around the longitudinal axis of the missile.

2. The system according to claim 1, wherein said at least one actuator is an endless screw type actuator.

3. The system according to claim 1, wherein said at least one moving flow deflector comprises a flow deflection member and at least one arm having a first end hinged on said bottom of said missile and a second end integral with the flow deflection member.

4. The system according to claim 3, wherein said nozzle comprises a diverging flare, and wherein a length of said deflection member is at least equal to an outlet diameter of said diverging flare.

5. The system according to claim 3, wherein said flow deflection member is made of a heat refractory material.

6. The system according to claim 1, wherein said at least one moving flow deflector is controlled by an actuator of the jack type.

* * * * *